(12) United States Patent
Wang (10) Patent No.: US 8,396,973 B2
(45) Date of Patent: Mar. 12, 2013

(54) DISTRIBUTED SPEECH SERVICE

(75) Inventor: Kuansan Wang, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1271 days.

(21) Appl. No.: 11/058,892

(22) Filed: Feb. 16, 2005

(65) Prior Publication Data

US 2006/0101146 A1    May 11, 2006

Related U.S. Application Data

(60) Provisional application No. 60/621,303, filed on Oct. 22, 2004.

(51) Int. Cl.
*G06F 15/16* (2006.01)
*G06F 15/177* (2006.01)

(52) U.S. Cl. ........ 709/228; 709/227; 709/204; 709/220; 709/230

(58) Field of Classification Search .................. 370/328, 370/352, 410; 709/227; 704/270; 379/88.12, 379/266
See application file for complete search history.

(56) References Cited

U.S. PATENT DOCUMENTS

| | | | |
|---|---|---|---|
| 5,960,399 A | 9/1999 | Barclay et al. | |
| 6,385,586 B1 | 5/2002 | Dietz | |
| 6,597,702 B1 * | 7/2003 | Caugherty | 370/410 |
| 6,885,658 B1 * | 4/2005 | Ress et al. | 370/352 |
| 6,934,756 B2 * | 8/2005 | Maes | 709/227 |
| 6,970,935 B1 * | 11/2005 | Maes | 709/230 |
| 6,977,911 B1 * | 12/2005 | Geen et al. | 370/328 |
| 7,042,871 B2 * | 5/2006 | Gallant et al. | 370/352 |
| 7,136,480 B2 * | 11/2006 | Mason | 379/266.02 |
| 7,319,979 B2 * | 1/2008 | Thomas et al. | 705/26.44 |
| 7,330,542 B2 * | 2/2008 | Kauhanen et al. | 379/229 |
| 7,529,675 B2 * | 5/2009 | Maes | 704/270.1 |
| 7,561,673 B2 * | 7/2009 | Wang | 379/88.03 |
| 2001/0005372 A1 * | 6/2001 | Cave et al. | 370/401 |
| 2002/0110113 A1 * | 8/2002 | Wengrovitz | 370/352 |
| 2002/0156903 A1 * | 10/2002 | Bach Corneliussen | 709/228 |
| 2002/0184373 A1 * | 12/2002 | Maes | 709/228 |
| 2003/0023730 A1 * | 1/2003 | Wengrovitz et al. | 709/227 |
| 2003/0088421 A1 * | 5/2003 | Maes et al. | 704/270.1 |
| 2003/0140159 A1 * | 7/2003 | Campbell et al. | 709/231 |
| 2004/0001580 A1 | 1/2004 | Mason | |
| 2004/0076145 A1 * | 4/2004 | Kauhanen et al. | 370/352 |
| 2004/0109541 A1 | 6/2004 | Celi et al. | |
| 2004/0141594 A1 * | 7/2004 | Brunson et al. | 379/88.12 |
| 2004/4109541 | 10/2004 | Celi et al. | |
| 2005/0193124 A1 * | 9/2005 | Chou et al. | 709/228 |
| 2006/0070081 A1 * | 3/2006 | Wang | 719/316 |
| 2006/0101146 A1 * | 5/2006 | Wang | 709/227 |

FOREIGN PATENT DOCUMENTS

| | | |
|---|---|---|
| EP | 0529864 | 8/1992 |
| EP | 0529864 A | 3/1993 |
| EP | 1650925 | 4/2006 |
| GB | 2395631 | 5/2004 |

(Continued)

OTHER PUBLICATIONS

SIP, "What is SIP Introduction", www.sipcenter.com, Feb. 15, 2005.

(Continued)

*Primary Examiner* — Tae Kim
(74) *Attorney, Agent, or Firm* — Merchant & Gould (57) ABSTRACT

The present invention relates to establishing a media channel and a signaling channel between a client and a server. The media channel uses a chosen codec and protocol for communication. Through the media channel and signaling channel, an application on the client can utilize speech services on the server.

17 Claims, 8 Drawing Sheets

FOREIGN PATENT DOCUMENTS

| | | |
|---|---|---|
| JP | 2002-505554 | 2/2002 |
| JP | 2004094085 | 3/2002 |
| JP | 2002-215670 | 8/2002 |
| JP | 2003-006106 | 1/2003 |
| JP | 2004-032579 | 1/2004 |
| JP | 2004/094085 | 3/2004 |
| JP | 2004-213665 | 7/2004 |
| JP | 2004-289803 | 10/2004 |
| JP | 2004-304612 | 10/2004 |
| JP | 2005-513662 | 5/2005 |
| JP | 2005-515716 | 5/2005 |
| JP | 2005-539324 | 12/2005 |
| WO | 03/055189 | 7/2003 |

OTHER PUBLICATIONS

TechOnLine, "Voice Processing" Bob Walder, NSS Group, www.techonline.com, May 8, 2002.

ComputerWeekly.com, "Technology: EAI Tools; Web Services: Speech Theraphy", Danny Bradbury, www.computerweekly.com, Jun. 8, 2004.

Wikipedia, "Session Initiation Protocol", en.wikipedia.org/wiki/Session_Initional_Protocol, Oct. 12, 2004.

Microsoft, "An Introduction to Telephony Call Control with Microsoft Speech Server 2004", www.microsoft.com/speech/evaluation/whitepapers/TelephoneCallContolDoc.com, Dan Kershaw, 2004.

XMLMania.com, "Ecma International Enhances SIP and Speech Service Support in CSTA", www.xmlmania.com, Sep. 16, 2004.

Alcatel Executive Internetworking, "Computer Supported Telephone Applications (CSTA)", Alcatel Executive Briefing, May 2002, pp. 1-6.

European Search Report, Mar. 6, 2006, 4 pages.

Burger, E. and Oran D., "Requirements for Distributed Control" ASR, SV TTS Resources, 8pp., Jun. 13, 2002.

Arango, M., Dugan, A., Elliott, I., Huitema, C., and Pickett, S., "Media Gateway Control Protocol (MGCP) Version 1.0", RFC 2705, Oct. 1999.

Cuervo, F., Greene, N., Rayhan, A., Huitema, C., Rosen, B., and Segers, J., "Megaco Protocol Version 1.0", RFC 3015, Nov. 2000.

Schulzrinne, H., Rao, A., and Lanphier, R., "Real Time Streaming Protocol (RTSP)", RFC 2326, Apr. 1998.

Shanmugham, S., Monaco, P., and B. Eberman, "MRCP: Media Resource Control Protocol", draft-shanmugham-mrcp-01.txt, Nov. 2001, work in progress.

Robinson, F., Marquette, B., and R. Hernandez, "Using Media Resource Control Protocol with SIP", draft-robinson-mrcp-sip-00.txt, Sep. 2001, work in progress.

World Wide Web Consortium, "Voice Extensible Markup Language (VoiceXML) Version 2.0", W3C Working Draft, ,http://www.w3.org/TR/2001/WD-voicexml20-20011023/>, Oct. 2001, work in progress.

Van Dyke, J. and Burger, E., "SIP URI Conventions for Media Servers", draft-burger-sipping-msuri-01, Jul. 2001, work in progress (expired).

Floyd, S., Daigle, L., ?IAB Architectural and Policy Considerations for Open Pluggable Edge Services, ?RFC3238, Jan. 2002.

Bradner, S., "The Internet Standards Process—Revision 3", BCP 9, RFC 2026, Oct. 1996.

Bradner, S., "Key words for use in RFCs to Indicate Requirement Levels", BCP 14, RFC 2119, Mar. 1997.

Handley, M., Schulzrinne, H., Schooler, E and Rosenberg, J., "SIP: Session Initiation Protocol", RFC 2543, Mar. 1999.

Guttman, E., Perkins, C., Veizades, J., Day, M., Service Location Protocol, Version 2,? RFC 2608, Jun. 1999.

Gulbrandson, A., Vixie, P., Esibov, L., ?A DNS RR for specifying the location of services (DNS SRV)?, RFC2782, Feb. 2000.

World Wide Web Consortium, "Speech Synthesis Markup Language Specification for the Speech Interface Framework", W3C Working Draft, http://www.w3.org/TR/speech-synthesis, Jan. 2001, work in progress.

World Wide Web Consortium, "Speech Recognition Grammar Specification for the W3C Speech Interface Framework", W3C Working Draft, http://www.w3.org/TR/speech-grammar, Aug. 2001, work in progress.

O'Connor, W., Burger, El, "Network Announcements with SIP", draft-ietf-sipping-netann-01.txt, Nov. 2001, work in progress.

European Search Report, 3 pages, May 9, 2006.

A. Gulbrandsen, P. Vixie and L. Esibov, "A DNS RR for specifying the location of services (DNS SRV)" Memorandum, Network Working Group, Troll Technologies, Micorsoft Corporation, Feb. 2000.

European Search Report, Sep. 5, 2006, 13 pages.

Office Action from corresponding Mexican application No. PA/a/2005/010163, filed Sep. 22, 2005, Office Action dated Nov. 11, 2009, 4 pages.

J. Rosenberg et al., RFC3261, SIP: Session Initiation Protocol, Jun. 30, 2002.

M. Handley et al., RFC2327, SDP: Session Description Protocol, Apr. 30, 1998.

Office Action from corresponding Chinese Patent Application No. 200510113305.4, filed Sep. 22, 2005, Office Action dated Mar. 8, 2010.

Office Action from corresponding Chinese Patent Application No. 200510113305.4, filed Sep. 22, 2005, Office Action dated Aug. 21, 2009.

Office Action from corresponding Russian Application No. 2005129428, filed Sep. 25, 2005, Office Action dated Mar. 29, 2010.

Office Action from corresponding Russian Application No. 2005129428, filed Sep. 25, 2005, Office Action dated Aug. 20, 2009.

Office Action from corresponding Mexican Application No. PA/a/2005/010163, filed Sep. 22, 2005, Office Action dated Feb. 23, 2010.

Office Action from corresponding Australian Patent Application No. 2005211611, filed Sep. 20, 2005, Office Action dated Mar. 29, 2010.

Office Action from corresponding Mexican application No. PA/a/2005/010163, filed Sep. 22, 2005, Office Action dated Jun. 11, 2010.

Office Action from corresponding Japanese Patent application No. 2005-275756, filed Sep. 22, 2005, Office Action dated Aug. 10, 2010.

Feng Liu, Wu Chou, Li Li, Jenni Li, "WSIP—Web Service SIP Endpoint for Converged Multimedia/Multimodal Communication over IP", Proceedings of the IEEE International Conference on Web Services, Jul. 6-9, 2004, pp. 690-697.

Japanese Notice of Rejection mailed Jan. 13, 2012 in Application No. 2005-275756, 6 pages.

* cited by examiner

DISTRIBUTED SPEECH SERVICE

REFERENCE TO CO-PENDING PATENT APPLICATIONS

The present application claims the benefit of U.S. provisional patent application Ser. No. 60/621,303, filed on Oct. 22, 2004, the contents of which is hereby incorporated by reference in its entirety.

BACKGROUND OF THE INVENTION

The present invention relates to methods and systems for defining and handling computer interactions. In particular, the present invention relates to methods and systems for establishing communication protocols between devices in a system, such as with a telecommunication system.

Computer Supported Telecommunication Applications (CSTA) is a widely adopted standard suite for global and enterprise communications. In particular, CSTA is a standard that specifies programmatic access and control of the telecommunication infrastructure. Software can be developed for a wide variety of tasks, ranging from initiating and receiving simple telephone calls to managing large scale multi-site collaborations via voice and video.

CSTA is standardized in a number of ECMA/ISO (ECMA International Rue du Rhône 114 CH-1204 Geneva, www.ecma-international.org) standards. The core operation model and the semantics of the CSTA objects, services and events are defined in ECMA-269. These CSTA features are defined in an abstract and platform independent way so that they can be adapted to various programming platforms. In addition, CSTA is accompanied with several standardized programming or protocol syntax, among them, ECMA-323 that defines the extensible markup language (XML) binding to CSTA commonly known as CSTA-XML, and ECMA-348, the Web Service Description Language (WSDL) binding. These language bindings, considered as part of the CSTA standard suite, insure maximum interoperability, making CSTA features available to computers running different operating systems through any standard transport protocols, including Transmission Control Protocol (TCP), Session Initiation Protocol (SIP), or Simple Object Access Protocol (SOAP).

Recently, CSTA has witnessed a strong adoption in the area of interactive voice services. This adoption has been advanced by enhanced voice services based on Speech Application Language Tags (SALT), which is further described in the SALT 1.0 Specification found at www.saltforum.org. By utilizing SALT, call centers can further be automated to include various speech related features. However, differences in call control and speech control applications create difficulties in facilitating distributed speech services. Thus, there is a need for establishing protocols in facilitating speech services.

SUMMARY OF THE INVENTION

The present invention relates to establishing a media channel and a signaling channel between a client and a server. The media channel uses a chosen codec and protocol for communication. Through the media channel and signaling channel, an application on the client can utilize speech services on the server.

DETAILED DESCRIPTION OF ILLUSTRATIVE EMBODIMENTS

Figure 1:
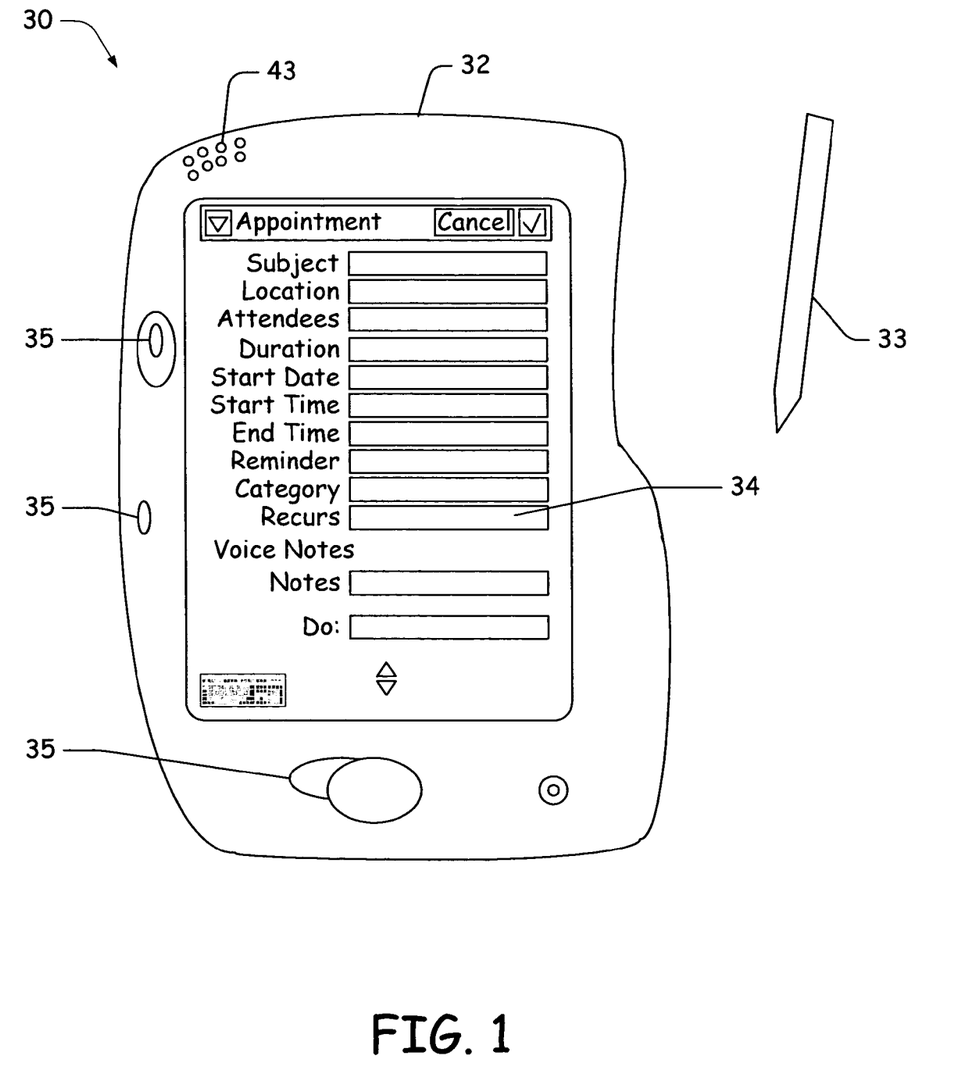
FIGS. 1-4 illustrate exemplary computing devices for use with the present invention.

Before describing an architecture for distributed speech services and methods for implementing the same, it may be useful to describe generally computing devices that can function in the architecture. Referring now to FIG. 1, an exemplary form of a data management device (PIM, PDA or the like) is illustrated at 30. However, it is contemplated that the present invention can also be practiced using other computing devices discussed below, and in particular, those computing devices having limited surface areas for input buttons or the like. For example, phones and/or data management devices will also benefit from the present invention. Such devices will have an enhanced utility compared to existing portable personal information management devices and other portable electronic devices, and the functions and compact size of such devices will more likely encourage the user to carry the device at all times. Accordingly, it is not intended that the scope of the architecture herein described be limited by the disclosure of an exemplary data management or PIM device, phone or computer herein illustrated.

An exemplary form of a data management mobile device 30 is illustrated in FIG. 1. The mobile device 30 includes a housing 32 and has an user interface including a display 34, which uses a contact sensitive display screen in conjunction with a stylus 33. The stylus 33 is used to press or contact the display 34 at designated coordinates to select a field, to selectively move a starting position of a cursor, or to otherwise provide command information such as through gestures or handwriting. Alternatively, or in addition, one or more buttons 35 can be included on the device 30 for navigation. In addition, other input mechanisms such as rotatable wheels, rollers or the like can also be provided. However, it should be noted that the invention is not intended to be limited by these forms of input mechanisms. For instance, another form of input can include a visual input such as through computer vision.

Figure 2:
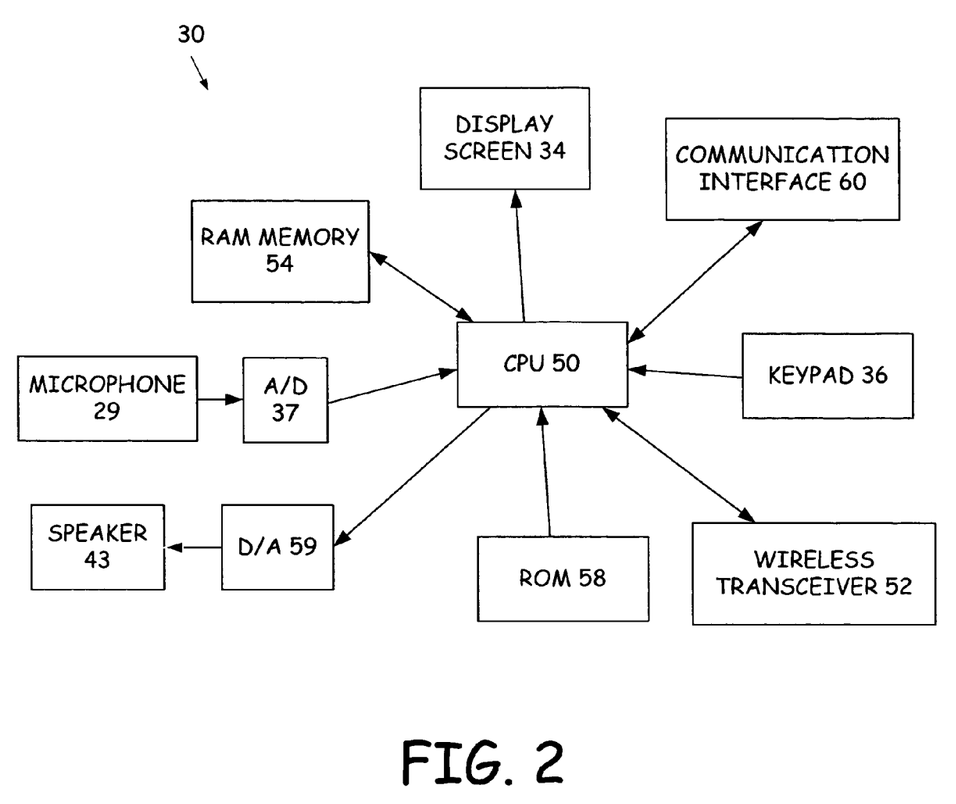

Referring now to FIG. 2, a block diagram illustrates the functional components comprising the mobile device 30. A central processing unit (CPU) 50 implements the software control functions. CPU 50 is coupled to display 34 so that text and graphic icons generated in accordance with the controlling software appear on the display 34. A speaker 43 can be coupled to CPU 50 typically with a digital-to-analog converter 59 to provide an audible output. Data that is downloaded or entered by the user into the mobile device 30 is stored in a non-volatile read/write random access memory store 54 bi-directionally coupled to the CPU 50. Random access memory (RAM) 54 provides volatile storage for instructions that are executed by CPU 50, and storage for temporary data, such as register values. Default values for configuration options and other variables are stored in a read only memory (ROM) 58. ROM 58 can also be used to store the operating system software for the device that controls the basic functionality of the mobile 30 and other operating system kernel functions (e.g., the loading of software components into RAM 54).

RAM 54 also serves as a storage for the code in the manner analogous to the function of a hard drive on a PC that is used to store application programs. It should be noted that although non-volatile memory is used for storing the code, it alternatively can be stored in volatile memory that is not used for execution of the code.

Wireless signals can be transmitted/received by the mobile device through a wireless transceiver 52, which is coupled to CPU 50. An optional communication interface 60 can also be provided for downloading data directly from a computer (e.g., desktop computer), or from a wired network, if desired. Accordingly, interface 60 can comprise various forms of communication devices, for example, an infrared link, modem, a network card, or the like.

Mobile device 30 includes a microphone 29, an analog-to-digital (A/D) converter 37, and an optional recognition program (speech, DTMF, handwriting, gesture or computer vision) stored in store 54. By way of example, in response to audible information, instructions or commands from a user of device 30, microphone 29 provides speech signals, which are digitized by A/D converter 37. The speech recognition program can perform normalization and/or feature extraction functions on the digitized speech signals to obtain intermediate speech recognition results.

Using wireless transceiver 52 or communication interface 60, speech data is transmitted to a remote speech server 204 discussed below and illustrated in the architecture of FIG. 5. Recognition results are then returned to mobile device 30 for rendering (e.g. visual and/or audible) thereon, and eventual transmission to a web server 202 (FIG. 5), wherein the web server 202 and mobile device 30 operate in a client/server relationship.

Similar processing can be used for other forms of input. For example, handwriting input can be digitized with or without pre-processing on device 30. Like the speech data, this form of input can be transmitted to the speech server 204 for recognition wherein the recognition results are returned to at least one of the device 30 and/or web server 202. Likewise, DTMF data, gesture data and visual data can be processed similarly. Depending on the form of input, device 30 (and the other forms of clients discussed below) would include necessary hardware such as a camera for visual input.

Figure 3:
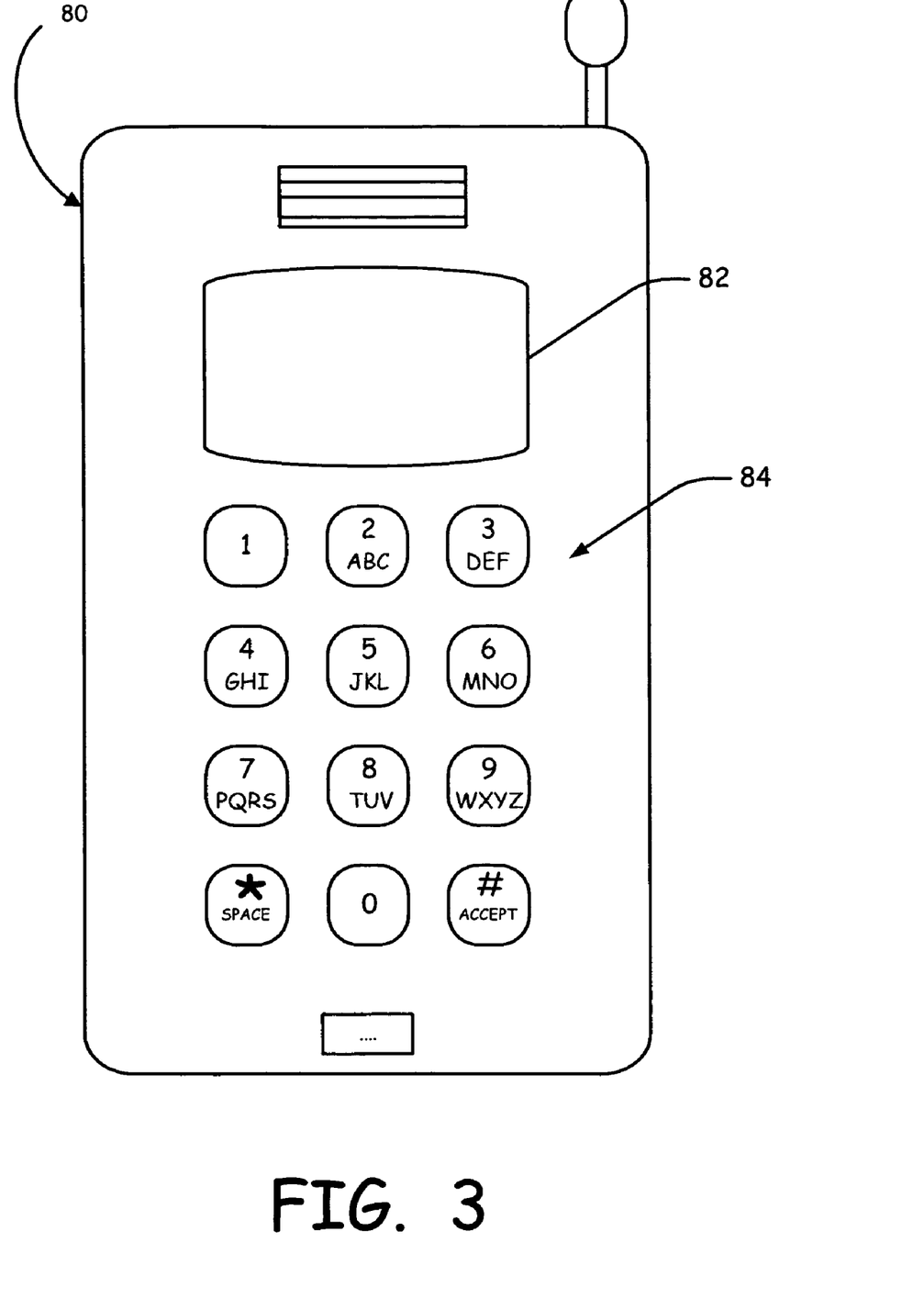

FIG. 3 is a plan view of an exemplary embodiment of a portable phone 80. The phone 80 includes a display 82 and a keypad 84. Generally, the block diagram of FIG. 2 applies to the phone of FIG. 3, although additional circuitry necessary to perform other functions may be required. For instance, a transceiver necessary to operate as a phone will be required for the embodiment of FIG. 2; however, such circuitry is not pertinent to the present invention.

In addition to the portable or mobile computing devices described above, it should also be understood that the present invention can be used with numerous other computing devices such as a general desktop computer. For instance, the present invention will allow a user with limited physical abilities to input or enter text into a computer or other computing device when other conventional input devices, such as a full alpha-numeric keyboard, are too difficult to operate.

The invention is also operational with numerous other general purpose or special purpose computing systems, environments or configurations. Examples of well known computing systems, environments, and/or configurations that may be suitable for use with the invention include, but are not limited to, regular telephones (without any screen) personal computers, server computers, hand-held or laptop devices, multiprocessor systems, microprocessor-based systems, set top boxes, programmable consumer electronics, radio frequency identification (RFID) devices, network PCs, minicomputers, mainframe computers, distributed computing environments that include any of the above systems or devices, and the like.

Figure 4:
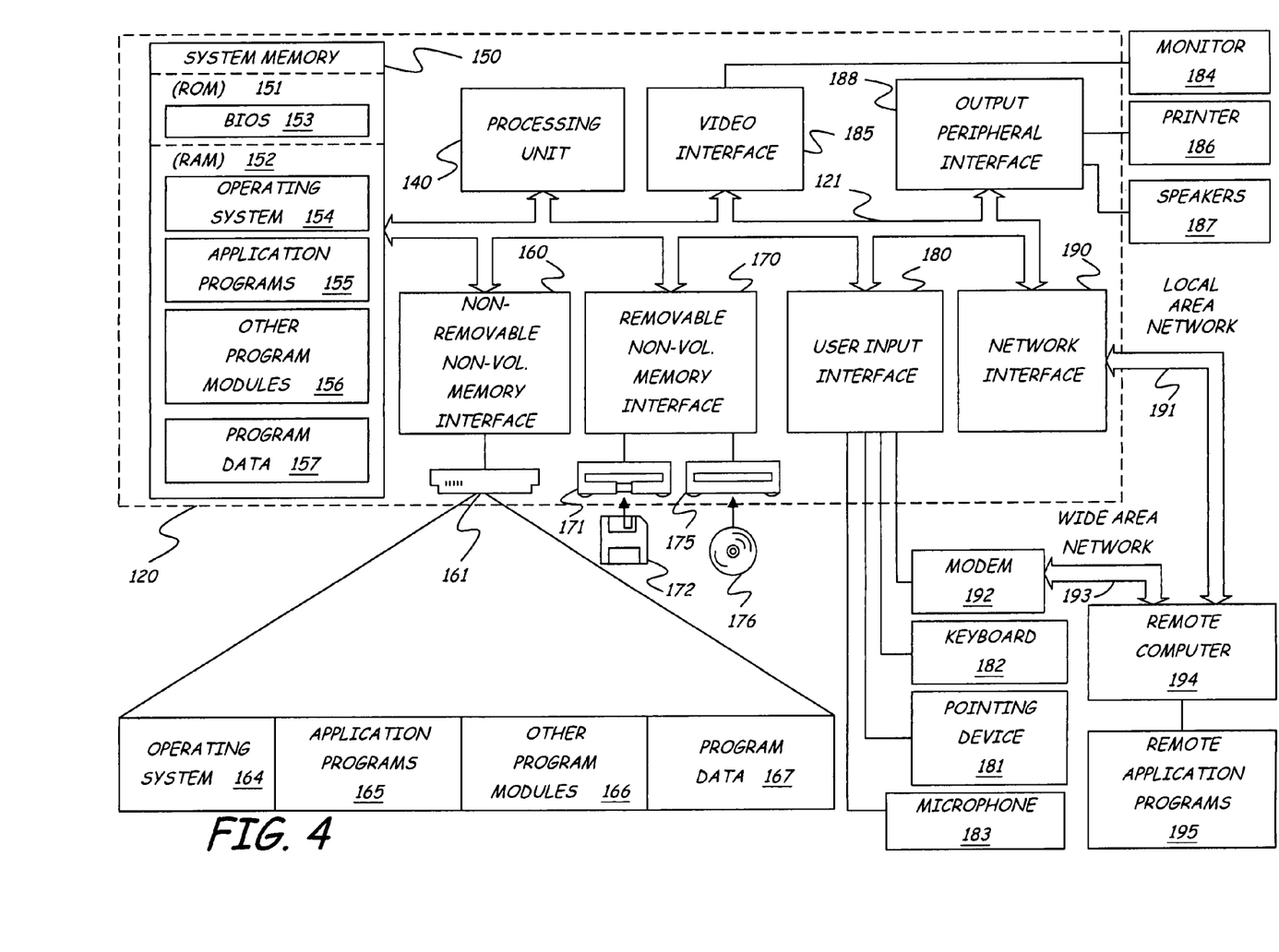

The following is a brief description of a general purpose computer 120 illustrated in FIG. 4. However, the computer 120 is again only one example of a suitable computing environment and is not intended to suggest any limitation as to the scope of use or functionality of the invention. Neither should the computer 120 be interpreted as having any dependency or requirement relating to any one or combination of components illustrated therein.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. Tasks performed by the programs and modules are described below and with the aid of figures. Those skilled in the art can implement the description and figures as processor executable instructions, which can be written on any form of a computer readable medium.

With reference to FIG. 4, components of computer 120 may include, but are not limited to, a processing unit 140, a system memory 150, and a system bus 141 that couples various system components including the system memory to the processing unit 140. The system bus 141 may be any of several types of bus structures including a memory bus or memory controller, a peripheral bus, and a local bus using any of a variety of bus architectures. By way of example, and not limitation, such architectures include Industry Standard Architecture (ISA) bus, Universal Serial Bus (USB), Micro Channel Architecture (MCA) bus, Enhanced ISA (EISA) bus, Video Electronics Standards Association (VESA) local bus, and Peripheral Component Interconnect (PCI) bus also known as Mezzanine bus. Computer 120 typically includes a variety of computer readable mediums. Computer readable mediums can be any available media that can be accessed by computer 120 and includes both volatile and nonvolatile media, removable and non-removable media. By way of example, and not limitation, computer readable mediums may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 120.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

The system memory 150 includes computer storage media in the form of volatile and/or nonvolatile memory such as read only memory (ROM) 151 and random access memory (RAM) 152. A basic input/output system 153 (BIOS), containing the basic routines that help to transfer information between elements within computer 120, such as during start-up, is typically stored in ROM 151. RAM 152 typically contains data and/or program modules that are immediately accessible to and/or presently being operated on by processing unit 140. By way of example, and not limitation, FIG. 4 illustrates operating system 54, application programs 155, other program modules 156, and program data 157.

The computer 120 may also include other removable/non-removable volatile/nonvolatile computer storage media. By way of example only, FIG. 4 illustrates a hard disk drive 161 that reads from or writes to non-removable, nonvolatile magnetic media, a magnetic disk drive 171 that reads from or writes to a removable, nonvolatile magnetic disk 172, and an optical disk drive 175 that reads from or writes to a removable, nonvolatile optical disk 176 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 161 is typically connected to the system bus 141 through a non-removable memory interface such as interface 160, and magnetic disk drive 171 and optical disk drive 175 are typically connected to the system bus 141 by a removable memory interface, such as interface 170.

The drives and their associated computer storage media discussed above and illustrated in FIG. 4, provide storage of computer readable instructions, data structures, program modules and other data for the computer 120. In FIG. 4, for example, hard disk drive 161 is illustrated as storing operating system 164, application programs 165, other program modules 166, and program data 167. Note that these components can either be the same as or different from operating system 154, application programs 155, other program modules 156, and program data 157. Operating system 164, application programs 165, other program modules 166, and program data 167 are given different numbers here to illustrate that, at a minimum, they are different copies.

A user may enter commands and information into the computer 120 through input devices such as a keyboard 182, a microphone 183, and a pointing device 181, such as a mouse, trackball or touch pad. Other input devices (not shown) may include a joystick, game pad, satellite dish, scanner, or the like. These and other input devices are often connected to the processing unit 140 through a user input interface 180 that is coupled to the system bus, but may be connected by other interface and bus structures, such as a parallel port, game port or a universal serial bus (USB). A monitor 184 or other type of display device is also connected to the system bus 141 via an interface, such as a video interface 185. In addition to the monitor, computers may also include other peripheral output devices such as speakers 187 and printer 186, which may be connected through an output peripheral interface 188.

The computer 120 may operate in a networked environment using logical connections to one or more remote computers, such as a remote computer 194. The remote computer 194 may be a personal computer, a hand-held device, a server, a router, a network PC, a peer device or other common network node, and typically includes many or all of the elements described above relative to the computer 120. The logical connections depicted in FIG. 4 include a local area network (LAN) 191 and a wide area network (WAN) 193, but may also include other networks. Such networking environments are commonplace in offices, enterprise-wide computer networks, intranets and the Internet.

When used in a LAN networking environment, the computer 120 is connected to the LAN 191 through a network interface or adapter 190. When used in a WAN networking environment, the computer 120 typically includes a modem 192 or other means for establishing communications over the WAN 193, such as the Internet. The modem 192, which may be internal or external, may be connected to the system bus 141 via the user input interface 180, or other appropriate mechanism. In a networked environment, program modules depicted relative to the computer 120, or portions thereof, may be stored in the remote memory storage device. By way of example, and not limitation, FIG. 4 illustrates remote application programs 195 as residing on remote computer 194. It will be appreciated that the network connections shown are exemplary and other means of establishing a communications link between the computers may be used.

Figure 5:
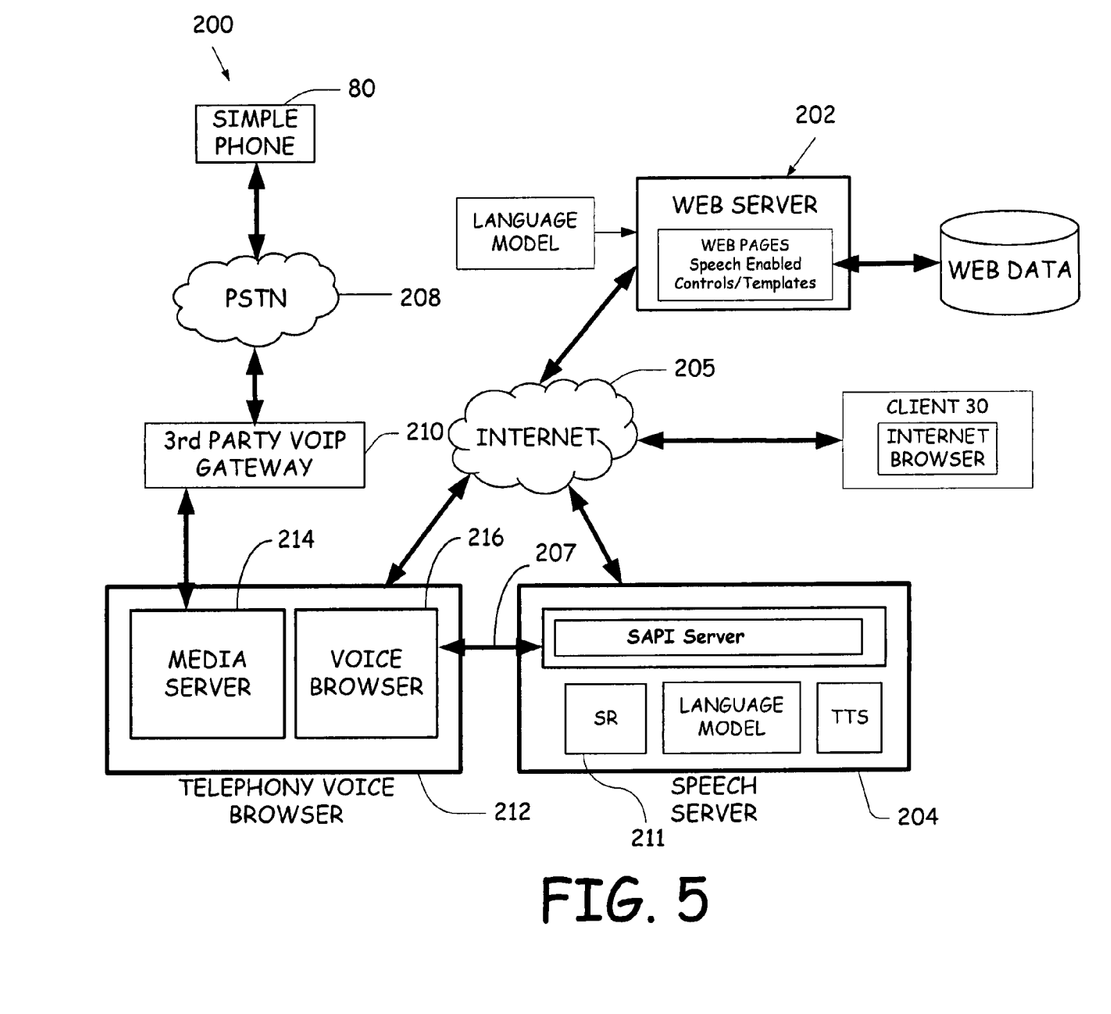
FIG. 5 illustrates an exemplary architecture for distributed speech services.

FIG. 5 illustrates an exemplary architecture 200 for distributed speech services as can be embodied in the present invention. Generally, information stored in a web server 202 can be accessed through mobile device 30 (which herein also represents other forms of computing devices having a display screen, a microphone, a camera, a touch sensitive panel, etc., as required based on the form of input), or through phone 80 wherein information is requested audibly or through tones generated by phone 80 in response to keys depressed and wherein information from web server 202 is provided only audibly back to the user.

More importantly though, architecture 200 is unified in that whether information is obtained through device 30 or phone 80 using speech recognition, a single speech server 204 can support either mode of operation. In addition, architecture 200 operates using an extension of well-known mark-up languages (e.g. HTML, XHTML, cHTML, XML, WML, and the like). Thus, information stored on web server 202 can also be accessed using well-known GUI methods found in these mark-up languages. By using an extension of well-known mark-up languages, authoring on the web server 202 is easier, and legacy applications currently existing can be also easily modified to include voice recognition.

Generally, device 30 executes HTML+ scripts, or the like, provided by web server 202. When voice recognition is required, by way of example, speech data, which can be digitized audio signals or speech features wherein the audio signals have been preprocessed by device 30 as discussed above, are provided to speech server 204 with an indication of a grammar or language model to use during speech recognition. The implementation of the speech server 204 can take many forms, one of which is illustrated, but generally includes a recognizer 211. The results of recognition are provided back to device 30 for local rendering if desired or appropriate. Upon compilation of information through recognition and any graphical user interface if used, device 30 sends the information to web server 202 for further processing and receipt of further HTML scripts, if necessary.

As illustrated in FIG. 5, device 30, web server 202 and speech server 204 are commonly connected, and separately addressable, through a network 205, herein a wide area network such as the Internet. It therefore is not necessary that any of these devices be physically located adjacent each other. In particular, it is not necessary that web server 202 includes speech server 204. In this manner, authoring at web server 202 can be focused on the application to which it is intended without the authors needing to know the intricacies of speech server 204. Rather, speech server 204 can be independently designed and connected to the network 205, and thereby, be updated and improved without further changes required at web server 202. In a further embodiment, client 30 can directly communicate with speech server 204, without the need for web server 202. It will further be appreciated that the web server 202, speech server 204 and client 30 may be combined depending on the capabilities of the implementing machines. For instance, if the client comprises a general purpose computer, e.g. a personal computer, the client may include the speech server 204. Likewise, if desired, the web server 202 and speech server 204 can be incorporated into a single machine.

Access to web server 202 through phone 80 includes connection of phone 80 to a wired or wireless telephone network 208, that in turn, connects phone 80 to a third party gateway 210. Gateway 210 connects phone 80 to a telephony voice browser 212. Telephone voice browser 212 includes a media server 214 that provides a telephony interface and a voice browser 216. Like device 30, telephony voice browser 212 receives HTML scripts or the like from web server 202. More importantly though, the HTML scripts are of the form similar to HTML scripts provided to device 30. In this manner, web server 202 need not support device 30 and phone 80 separately, or even support standard GUI clients separately. Rather, a common mark-up language can be used. In addition, like device 30, voice recognition from audible signals transmitted by phone 80 are provided from voice browser 216 to speech server 204, either through the network 205, or through a dedicated line 207, for example, using TCP/IP. Web server 202, speech server 204 and telephone voice browser 212 can be embodied in any suitable computing environment such as the general purpose desktop computer illustrated in FIG. 4.

However, it should be noted that if DTMF recognition is employed, this form of recognition would generally be performed at the media server 214, rather than at the speech server 204. In other words, the DTMF grammar would be used by the media server.

Figure 6:
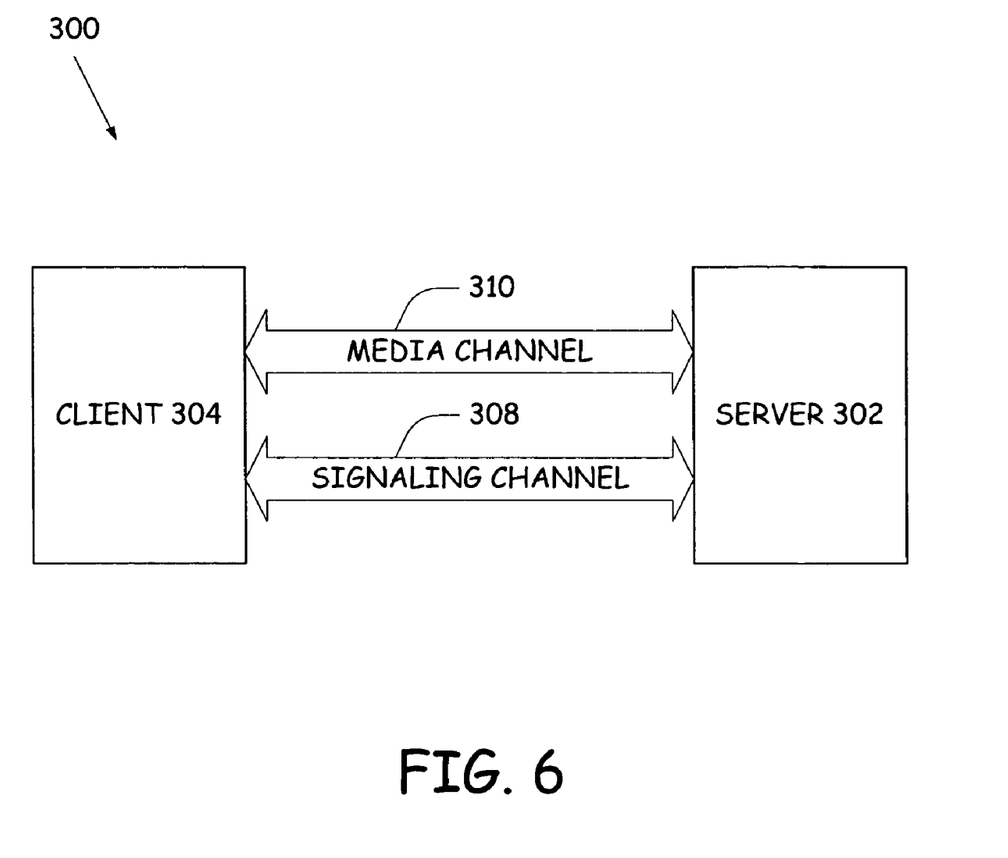
FIG. 6 illustrates an exemplary system for implementing distributed speech services.

Given the devices and architecture described above, the present invention will further be described based on a simple client/server environment. As illustrated in FIG. 6, the present invention pertains to a system 300 comprising a server 302 that provides media services (e.g. speech recognition or text to speech synthesis) and a client 304 that executes application specific codes. Communication between the server 302 and client 304 is based on a service model where information can be exchanged or tagged or otherwise include identified portions such as, but not limited to, XML (Extended Markup Language) documents. The server 302 and/or client 304 can collect and transmit audio in addition to other information. In one embodiment, server 302 can comprise Microsoft Speech Server developed by Microsoft Corporation of Redmond, Wash., while the client 304 can take any number of forms as discussed above, including but not limited to, desktop PCs, mobile devices, etc.

At this point it should be noted that although the server 302 and client 304 communicate with each other based on a service model, application evoking aspects of the present invention need not be exclusively written based on a service model in that declarative and/or procedural based applications can be used as long as communication between the server 302 and a client 304 is performed in accordance with service model requests. In one embodiment, the client application can be composed in C++, Java, C# or other imperative programming languages that do not require a browser as is the case for HTML based applications described in FIG. 5.

An important aspect of CSTA (ECMA-269) Edition 6 is the enhanced voice services based on Speech Application Language Tags (SALT). The newly added features include automatic speech recognition, speech verification, speaker identity, speaker verification and text-to-speech synthesis that can be implemented on system 300. Some or all of these features are provided in automated call centers. Aspects of the present invention provide a subset of CSTA services for facilitating network based speech services. In particular, some aspects of the present invention illustrate how ECMA-348 and uaCSTA (ECMA-TR/87) can be applied to facilitate distributed speech services in a web service and SIP (Session Initiated Protocol) based VoIP (Voice-over Internet Protocol) environment, respectively.

Services for Computer Supported Telecommunications Applications (CSTA) ECMA-269, and their XML and web service protocols are defined by ECMA-323 and ECMA-348, respectively. Recently, ECMA-TR/87 (uaCSTA) further describes a set of SIP conventions for using ECMA-323 in the VoIP environment. All these protocols address the full set of CSTA in principle, and hence are applicable to the voice services in specific. In the 6th Edition of ECMA-269, the voice services portion of CSTA have been augmented based on technology derived from SALT. In addition to the existing voice services, a new addition includes key features that are essential for call center automation and mobile applications, including automatic speech recognition, speech verification, speaker identification, speaker verification and text-to-speech synthesis, etc.

Although tightly integrated CSTA implementations of call control and voice scenarios are desirable to application developers, the core competencies between call control and speech vendors are not necessarily the same. For current deployment and in the foreseeable future, CSTA application developers may need to involve multiple vendors to meet their respective needs in these areas. Fortunately, the CSTA modeling concept, as depicted in ECMA-269, allows a single application to elicit services from multiple CSTA service providers. It is therefore a valid scenario where a CSTA application will simultaneously utilize two implementations of CSTA, one for call control and the other for voice services.

The CSTA profiles for speech services have not been as refined as in the area of call control. Aspects of the present invention describe a CSTA profile for providing speech services in a platform independent means using XML. Although the CSTA profile is a transport that is agnostic in nature, two common applications of the speech service profile are exemplified herein to better promote end-to-end interoperability: the SIP environment based on small use CSTA, and the web service based environment based on ECMA-348.

The description provided herein provides examples of how subsets of CSTA Voice Services can be included to facilitate client-server based speech processing. The following ECMA Standards are incorporated herein by reference in their entirety: ECMA-269 Services for Computer Supported Telecommunication Applications (CSTA) Phase III; ECMA-323, SMLP Protocol for Computer Supported Telecommunication Applications (CSTA) Phase III; and ECMA-348 Web Service Description Language (WSDL) for CSTA. In addition, this application describes how CSTA Speech Services can be implemented on a SIP-based VoIP environment using the uaCSTA proposal. ECMA TR/87 should be used as a reference for uaCSTA, a copy of which is hereby incorporated by reference.

The client-server based speech processing described herein is able to handle asymmetric media types in a response/request cycle. For example, in providing speech recognition service, a client transmits audio data to a server. The server converts the audio data to text data and transmits the converted data back to the client. In the case of speech synthesis, the client transmits text data and the server responds with converted audio data. The data transmitted can be sent according to a specified protocol, such as one based on CSTA. As a result, the SIP and web services environment can be extended to include text-audio or audio-text audio-in-audio interactions.

ECMA TR/87 establishes a "signaling channel" 308 transport as illustrated in FIG. 6. The signaling channel 308 is used by the server 302 and client 304 to exchange information on what each should do as it pertains to call controls. When the server 302 comprises a telephone switch, the use of a signaling channel 308 is sufficient. However, if the server 304 is a speech server and client 304 is asking for a speech service, the server 302 will also have to know where to receive and transmit speech information. For example, the server 302 should know where to obtain speech recognition information, and where to send synthesized speech.

Therefore, in addition to establishing a signaling channel 308, a "media channel" 310 protocol must also be established. For instance, the media channel 310 is used to transport speech data (audio data) collected by the client 304 to the server 302. Likewise, in a text-to-speech operation, client 304 can send the text data through the signaling channel 308 while the synthesized speech data is provided back to the client 304 from the server 302 through the media channel 310.

With respect to the architecture of FIG. 5, the signaling channel 308 and the media channel 310 are established for any communication to the speech server 204. However, it should be noted that use of the web application server 202 is optional and that the application can reside on the client 30 as illustrated in FIG. 5.

One aspect of the present invention is what steps are taken to implement the media channel 310. In one exemplary embodiment, establishing a media channel 310 for CSTA in a SIP environment is discussed. In a further exemplary embodiment, what steps are taken to implement the media channel 310 for CSTA on a web service based environment is discussed.

It is worth noting that semantic information can be transferred between server 302 and client 304, for example by using Speech Application Description Language (SADL), which can specify the XML schema for results returned by the listener resource, i.e. results returned by the server 302 with speech recognition.

Establishment of Channels in a SIP Environment

Figure 7:
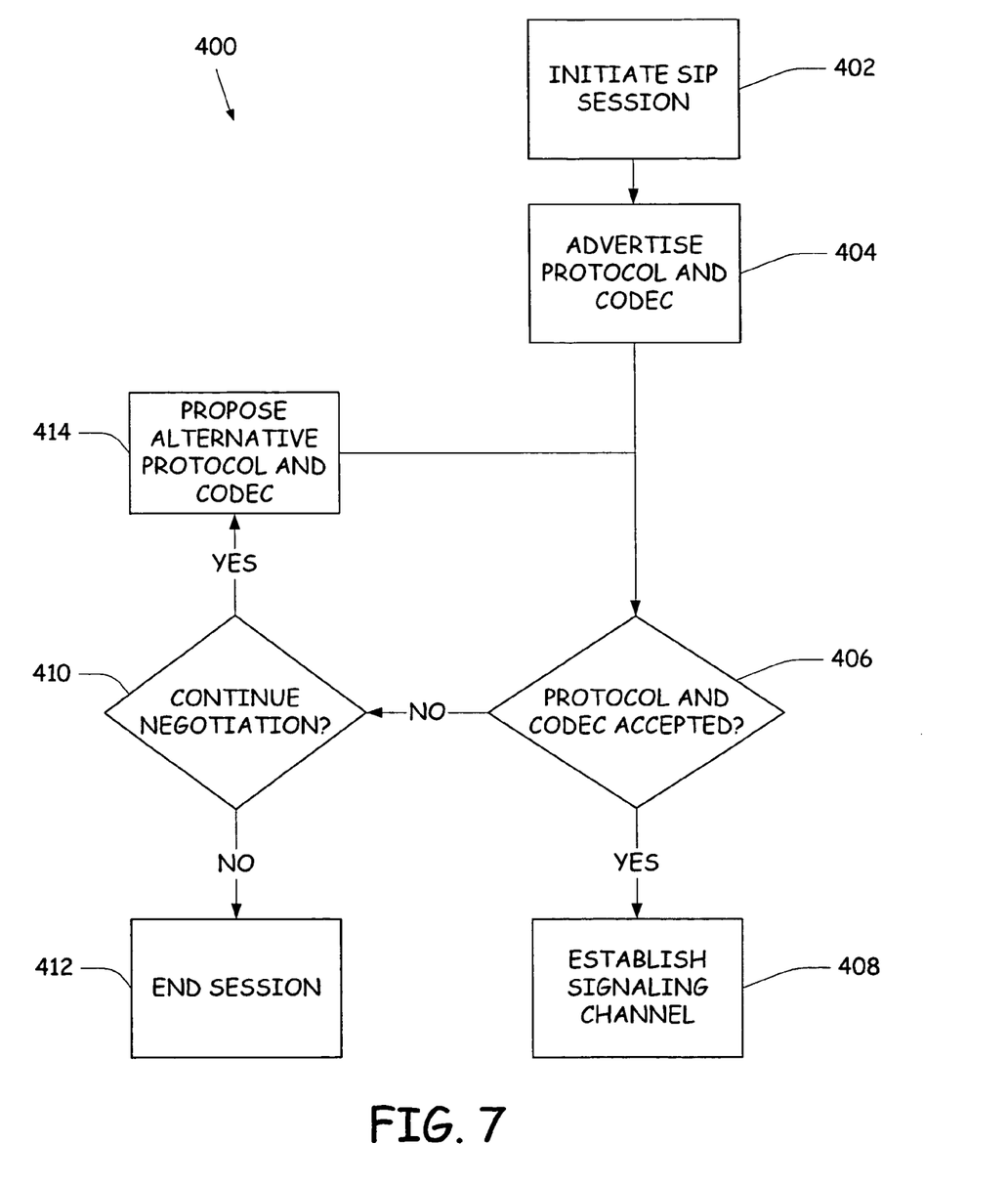
FIG. 7 illustrates an exemplary method for establishing channels in a SIP environment.

SIP is a protocol that is designed to be "chatty", being that the server 302 and the client 304 exchange small pieces of information frequently. In the SIP environment, establishment of the media channel 310 is accomplished through the Session Description Protocol (SDP). An exemplary method 400 to accomplish this task is illustrated in FIG. 7.

At step 402, the client 304 initiates a session with the server 302 using a SIP-Invite. An SDP description is also sent that declares an IP (Internet Protocol) address that should be used and a port on the IP address that should be used for the audio. In addition, at step 404, the SDP description will advertise which codec type of encoding is used for the media stream and a communication protocol such as transmission control protocol (TCP) or real-time transport protocol (RTP).

Upon receipt by the server, the server can decide whether to accept the SDP description stated by the client 304, at step 406. If the protocol and codec are accepted, the server 302 responds with a SIP-okay and with its own SDP description listing its IP address and audio port. Then, method 400 proceeds to step 408, wherein a signaling channel is established.

In the alternative, if the server 302 does not support the proposed codec or protocol, the server 302 can begin negotiating with the client 304 as to which codec and/or protocol will be used. In other words, the server 302 will respond to the client's 304 initial SDP description with a counter-offer proposing a different codec and/or protocol. Before making a proposal, method 400 proceeds to step 410, where a determination is made as to whether recognition should continue. For example, at step 412, after a specified number of counter offers have been proposed, the communication will stop. Additional counter offers can be made between client 304 and the server 302 at step 414 until an agreement is reached or until it is clear that no agreement will be reached.

SIP/SDP is a standard approved by the Internet Engineering Task Force (IETF) that is used to establish the audio channel in voice-over IP. However, SIP/SDP does not describe a method for establishing a signaling channel implementing CSTA. At step 408, the signaling channel 308 is established per ECMA-TR/87. After establishment of the signaling channel, the application association is considered complete. As a result, distributed speech services can be implemented in system 300.

Establishment of Channels in a Web Service Environment

Figure 8:
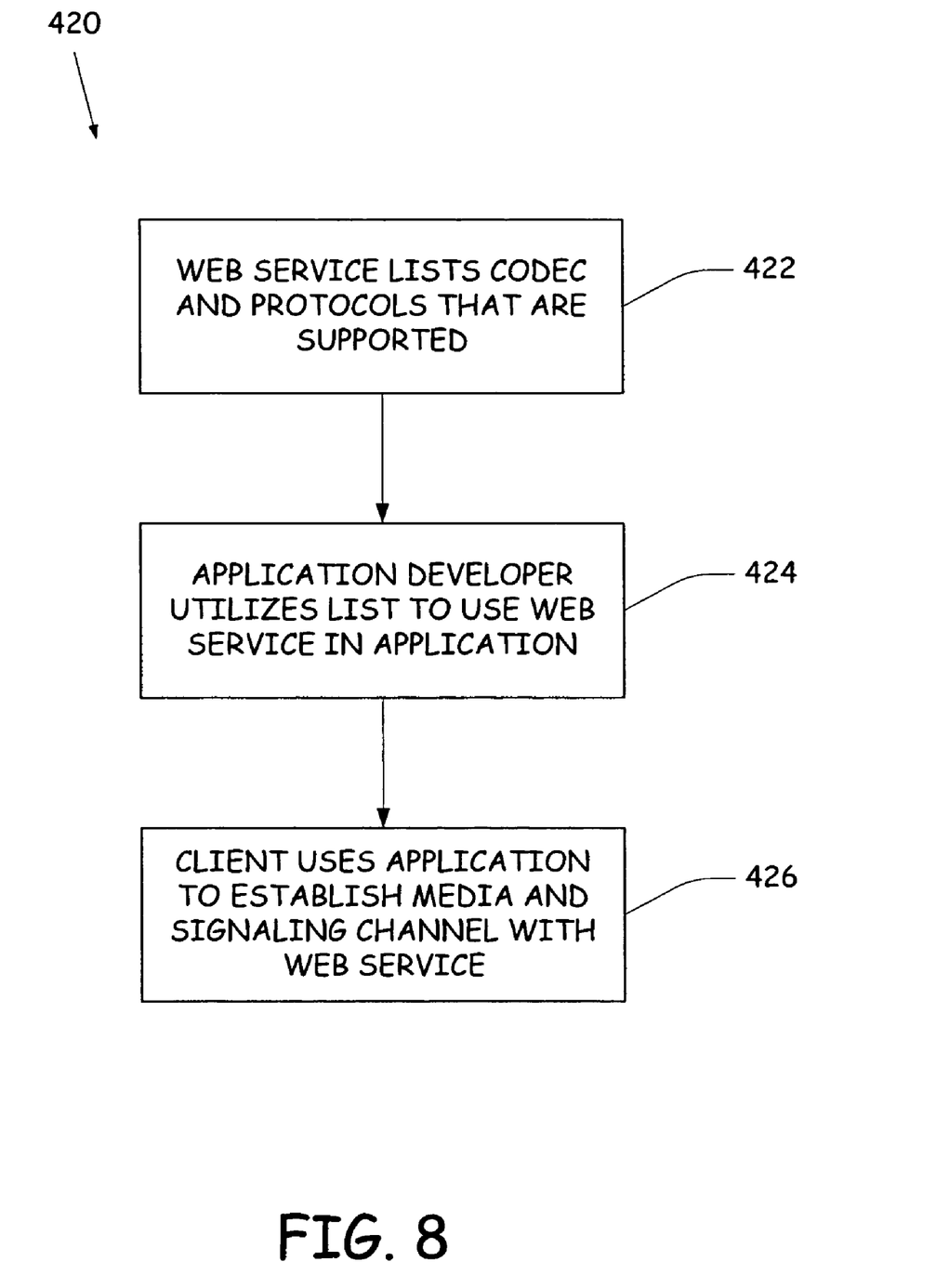
FIG. 8 illustrates an exemplary method for establishing channels in a web service environment.

In contrast to the "chatty" nature of SIP as described above, web services are designed and often optimized for "chunky" communications so that fewer dialog exchanges between the server 302 and the client 304 are needed. As a result, features that are negotiated in multiple dialog turns in SIP are usually described and discovered through service descriptions published in the public directories for the web services or obtained dynamically in a web services metadata exchange. A web service environment includes a UDDI (Uniform Description Discovery Integration) standard protocol. Web service providers publish relevant information that application developers can discover, obtain, and thereby chose the appropriate service provider, which allows the application developers to dynamically integrate the web service in the application. For instance, ECMA-348 specifies the web service Description Language (WSDL) for CSTA so that web services offering CSTA functionality can be uniformly described, discovered and integrated using standard web service protocols. Establishment of the media channel is an extension to the ECMA-348.

FIG. 8 illustrates an exemplary method 420 to establish channels in a web service environment. In the current invention, web service providers list as service metadata all the codec and protocols that are supported by the web service at step 422. An application developer can utilize web service directory providers to obtain or discover which web service has a codec and protocol that it can use at step 424. This step can be performed by searching through the metadata of each web service provided in order to find the desired codec and protocol it requires. The directory provides a URL (universal resource locator) address for each web service. The client 304 then makes a connection to the web service and uses an application with the desired codec and protocol to communicate with the server 302. After a connection is made, the media channel 310 and its signaling channel 308 are established at once.

The invention under the web service environment addresses how to establish the connections through all levels (application and transport) in one exchange through a media description extension to WSDL. In one embodiment, the invention can be applied in conjunction with ECMA-348, which already has a mechanism to establish CSTA and its underlying signaling transport protocol. By adding the media coding and transport protocol extension to ECMA-348, CSTA is thus enhanced to establish the signaling and media channels in a single step.

In another embodiment, the media description is conveyed using the extensibility of web services addressing, or WS-Addressing, protocol as a step preceding CSTA application association. WS-Addressing (WSA), is a specification that provides transport neutral mechanisms to address Web service endpoints and messages. Both CSTA switching functions and CSTA applications are web service endpoints. WS-Addressing introduces a new specification, called endpoint reference, that supports dynamic usage of services not appropriately covered with the <wsdl:service> and <wsdl:port> elements in WSDL.

WS-Addressing defines an XML document type (wsa:EndpointReferenceType) to represent an endpoint reference. An XML element, wsa:EndpointReference, is also specified to have the type. Both reside in the XML namespace http://schemas.xmlsoap.org/ws/2004/03/addressing.

A WSA Endpoint Reference type can include the following:

[address]: an URI (Uniform Resource Identifier) identifies the endpoint.

[reference properties]: <xs:any/> (0 .. unbounded), specific properties, one for each entity or resource being conveyed.

[selected port type]: QName (0..1), the name of the primary port type as defined in WSDL for the endpoint.

[service and port]: (QName, NCName(0..1))(0..1), the service and the port, as defined in WSDL, that correspond to the endpoint.

[policy]: optional WS-Policy elements describing the behaviour, requirements, and capabilities of the endpoint.

As is in the case of SIP, establishing an audio channel is necessary for CSTA speech services. As an audio channel can be negotiated in SIP via SDP, WSA Endpoint reference can be used for speech service providers to declare the media endpoint. Media transport protocols and the coding mechanisms are among the critical items needed to be specified in order to facilitate speech services. These items are declared as reference properties.

To improve robustness, the media channel in a web service environment is modeled as a lease from the server (CSTA voice resources provider) to the client (CSTA application), and the lease expires over time. The server can also designate a lease manager where the client can cancel or renew the lease.

A CSTA Media Endpoint Reference Type, with an XML Schema, includes one or multiple WSA Endpoint references. For example, a CSTA speech service provider that utilizes the G.711 protocol over Real-time Transport Protocol (RTP) at port 6060 may describe the media endpoint as follows:

```
<csta:MediaEndpointReference
xmlns:csta="http://www.ecma
international.org/TR/xx"
xmlns:wsa="http://schemas.xmlsoap.org/ws/2004/03/addressing">
<wsa:Address>rtp://server.acme.com:6060</wsa:Address>
    <wsa:ReferenceProperties>
        <csta:Codec>G.711</csta:Codec>
<csta:SubscriptionID>12345</csta:SubscriptionID>
        <csta:Expires>2004-10-21T21:07:00.000-08:00</csta:Expires>
    </wsa:ReferenceProperties>
</csta:MediaEndpointReference>
```

CSTA media endpoint reference properties include a codec declaration, a subscription identifier, and an optional lease expiration declaration. As in the case of uaCSTA, where a media channel is established together with the signalling channel, the above media endpoint reference must be included before the CSTA application association process under the web service environments is considered complete.

Taking advantage of the extensibility of WS protocols, a speech session can be established using <wsa:Action>. The media endpoint reference may itself be a reference property in the endpoint reference of a CSTA Web service provider. A Simple Object Access Protocol (SOAP) message is composed by attaching the media endpoint reference immediately after the <wsa:To>, as is shown below:

```
<soap:Envelop
    xmlns:soap="http:/www.w3.org/2003/05/soap-envelop"
xmlns:wsa="http:/schemas.xmlsoap.org/ws/2004/03/addressing"
    xmlns:csta="http:/www.ecma-international.org/TR/xx">
    <soap:Header>
        <wsa:ReplyTo>
<wsa:Address>http:/example.client.com</wsa:Address>
        </wsa:ReplyTo>
        <wsa:To>http:/server.acme.com</wsa:To>
        <csta:MediaEndpointReference>
            ...
        </csta:MediaEndpointReference>
        <wsa:Action>
            http:/www.ecma-international.org/TR/xx/CreateSession
        </was:Action>
        <wsa:MessageID> ... </wsa:MessageID>
    </soap:Header>
    <soap:Body>
        ...
    </soap:Body>
</soap:Envelop>
```

Web Services are described by metadata such as WS-Policy and WSDL. While WS-Policy describes general capabilities, requirements and characteristics of a service, WSDL describes abstract message operations and concrete network protocols and addresses to reach the web service. Web Services Metadata Exchange, WS-MEX or WSX, is a specification that bootstraps the retrieval of metadata. A client may send a WS-MEX request to an endpoint to obtain its metadata. A normative outline for the request using SOAP is as follows:

```
<soap:Envelope ...>
    <soap:Header ...>
        <wsa:Action>
http://schemas.xmlsoap.org/ws/2004/09/mex/GetMetadata/Request
        </wsa:Action>
        <wsa:MessageID>            <xs:anyURI/>
```

```
</wsa:MessageID>
        <wsa:ReplyTo>    WS-Addressing    endpoint
reference </wsa:ReplyTo>
        <wsa:To> <xs:anyURI/> </wsa:To>
        ...
    </soap:Header>
    <soap:Body>
        <wsx:GetMetadata ...>
            [<wsx:Dialect
[Identifier='<xs:anyURI/>']? >
                <xs:anyURI/>
            </wsx:Dialect>
            ]*
        </wsx:GetMetadata>
    </soap:Body>
</soap:Envelop>
```

As shown in the SOAP header, WS-MEX uses WS-Addressing to specify the request for retrieving metadata. The targeted service is specified as a URI in the <wsa:To>, and the reply endpoint is specified using WS-Addressing endpoint reference in the content of <wsa:ReplyTo>. The types of metadata to be retrieved are specified in the content of <wsx:GetMetadata> in the SOAP body.

If an endpoint accepts GetMetadata request, it must reply with a GetMetadata response message. The normative outline for the response in SOAP is as follows:

```
<soap:Envelop ...>
    <soap:Header ...>
        <wsa:Action>
http://schemas.xmlsoap.org/ws/2004/09/mex/GetMetadata/Response
        </wsa:Action>
        <wsa:RelatesTo>   previous   message   id
</wsa:RelatesTo>
        <wsa:To> <xs:anyURI/> </wsa:To>
    </soap:Header>
    <soap:Body>
        <wsx:Metadata ...>
            [<wsa:MetadataSection    Dialect="dialect URI"
                [Identifier='previous identifier']>
                <xs:any/> <!-- service specific data section -->
                |
                <wsx:MetadataReference>
                    WS-Addressing endpoint reference
                </wsx:MetadataRefernce>
                |
                <wsx:Location>     <xs:anyURI/>
</wsx:Location>
            ]
            </wsa:MetadataSection>]*
        </wsx:Metadata>
    </soap:Body>
</soap:Envelop>
```

Conveyed in the SOAP body, the metadata can be returned inline as contents of <wsx:Metadata> element, or by reference using WS-Addressing endpoint reference or simply URI.

The above SOAP messages can have WSDL bindings as follows:

```
<wsdl:message name="GetMetadataMsg">
    <wsdl:part                 name="body"
element="tns:GetMetadata"/>
</wsdl:message>
<wsdl:message name="GetMetadataResponseMsg">
    <wsdl:part                 name="body"
element="tns:Metadata"/>
</wsdl:message>
<wsdl:portType name="MetadataExchange">
    <wsdl:operation name="GetMetadata">
        <wsdl:input message="tns:GetMetadataMsg"
            wsa:Action=
"http:/schemas.xmlsoap.org/ws/2004/09/mex/GetMetadata/Request" />
        <wsdl:output
message="tns:GetMetadataResponseMsg"
            wsa:Action=
"http:/schemas.xmlsoap.org/ws/2004/09/mex/GetMetadata/Response" />
    </wsdl:operation>
    ...
</wsdl:portType>
```

CSTA media description is a type of metadata that CSTA applications must obtain from the voice service provider. WS-MEX is particularly suitable here. Below is a sample SOAP message for retrieving media endpoint reference:

```
<soap:Envelope
xmlns:soap="http://www.w3.org/2003/05/soap-envelop"
xmlns:wsa="http://schemas.xmlsoap.org/ws/2004/08/addressing"
xmlns:wsx="http://schemas.xmlsoap.org/ws/2004/09/mex"
xmlns:csta="http://www.ecma-international.org/TR/XX">
    </soap:Header>
        <wsa:Action>
http:/schemas.xmlsoap.org/ws/2004/09/mex/GetMetadata/Request
        </wsa:Action>
        <wsa:MessageID>
            uuid:12345edf-53c1-4923-ba23-23459cee433e
        </wsa:MessageID>
        <wsa:ReplyTo>
<wsa:Address>http://client.example.com/MyEndpoint</wsa:Address>
        </wsa:ReplyTo>
        <wsa:To>http:/server.acme.org</wsa:To>
    </soap:Header>
    <soap:Body>
        <wsx:GetMetadata>
            <wsx:Dialect>
                http:/www.ecma-
international.org/TR/XX/MediaEndpoint
            </wsx:Dialect>
        </wsx:GetMetadata>
    </soap:Body>
</soap:Envelop>
```

The example demonstrates a client application, located at client.example.com, that requests the media endpoint reference from a CSTA speech service provider at server.acme.org. Because a specific dialect is specified, the server must reply only the metadata of the desired type. A SOAP response message would be:

```
<soap:Envelop ...>
    <soap:Header>
        <wsa:Action>
http:/schemas.xmlsoap.org/ws/2004/09/mex/GetMetadata/Response
        </wsa:Action>
        <wsa:RelateTo>
            uuid:12345edf-53c1-4923-ba23-23459cee433e
        </wsa:RelateTo>
<wsa:To>http:/client.example.com/MyEndpoint</wsa:To>
    </soap:Header>
    <soap:Body>
        <wsx:Metadata>
            <wsx:MetadataSection Dialect=
                "http://www.ecma-international.org/TR/XX/MediaEndpoint">
                <csta:MediaEndpointReference>
<wsa:Address>rtp:/server.acme.org:6060</wsa:Address>
                    <wsa:ReferenceProperties>
                        <csta:Codec>G.711</csta:Codec>
```

```
<csta:SubscriptionID>12345</csta:SubscriptionID>
        <csta:Expires>2004-10-
21T21:00:00.0-22:00</csta:expires>
            </wsa:ReferenceProperties>
        </csta:MediaEndpointReference>
    </wsx:MetadataSection>
  </wsx:Metadata>
 </soap:Body>
</soap:Envelop>
```

Speech application description is another type of metadata a speech service may provide. Multiple metadata types can be obtained at the same time by populating the <wsx:GetMetadata> with their respective URIs through <wsx:Dialect>. The following is an example of the SOAP body for obtaining both media endpoint and speech application reference:

```
<wsx:GetMetadata>
    <wsx:Dialect>
        http://www./ecma-international.org/TR/xx/MediaEndpoint
    </wsx:Dialect>
    <wsx:Dialect>
        http://www.ecma-
international.org/TR/xx/SpeechApplicationDescription
    </wsx:Dialect>
</wsx:GetMetadata>
The corresponding response in the SOAP body:
<wsx:Metadata>
    <wsx:MetadataSection Dialect=
        "http://www.emca-international.org/TR/xx/MediaEndpoint">
        ...
    </wsx:MetadataSection>
    <wsx:MetadataSection Dialect=
        "http://www.ecma-
international.org/TR/xx/SpeechAppliationDescription">
        <csta:resource id="US_AddressRecognition">
            <csta:type>Listener</csta:type>
            <csta:grammar
          uri="urn:acme.com/address/street_number.grxml"
        schema="urn:acme.com/address/street_number.xsd"/>
            <csta:grammar
          uri="urn:acme.com/address/city.grxml">
                <csta:rule id="zip_code"
                    schema="urn:acme.com/address/zip.xsd"/>
                <csta:rule id="city_state"
                    schema="urn:acme.com/address/city.xsd"/>
            </csta:grammar>
        </csta:resource>
    </wsx:MetadataSection>
</wsx:Metadata>
```

While Web services start in a one-way, request and reply model, Web services often want to receive messages when events occur in other services or applications. Web Services Eventing, or WS-Eventing (WSE), is a specification to facilitate event notification. WS-Eventing defines how one web service can subscribe to events on behalf of another service or application, and allows applications to specify how event messages are delivered. It supports a wide variety of eventing topologies, allowing the event source and the final event sink to be decoupled. These properties are suitable for a wide range of CSTA applications, ranging from call centers to mobile computing. The use of WS-Eventing is provided because CSTA voice services need event notification to function.

Although the present invention has been described with reference to particular embodiments, workers skilled in the art will recognize that changes may be made in form and detail without departing from the spirit and scope of the invention.

What is claimed is:

1. A computer readable storage device having instructions encoded thereon which, when executed by a computer, will cause the computer to perform a method for providing speech services, the method comprising:
    providing a list of a plurality of codecs and a plurality of protocols; receiving information regarding selection of one of the plurality of codecs as an established codec and selection of one of the plurality of protocols as an established protocol, wherein the receiving information regarding the established codec and the established protocol occurs in one exchange between a client and a server in a web services environment, wherein the one exchange represents an enhancement of a communications application functionality by adding a media coding and transport protocol extension to a Web Services Description Language (WSDL) standard so that both a signaling channel and a media channel are established in a single step, the web services environment not being a Session Initiation Protocol environment, wherein the established codec and the established protocol are obtained as a result of a search through metadata of each of a plurality of web services;
    receiving signaling information through the signaling channel according to an established signaling protocol;
    receiving speech information through the media channel according to the established codec and the established protocol wherein the media channel expires after a set period of time; and
    processing the signaling information and the speech information.

2. The computer readable storage device of claim 1 wherein the instructions further comprise performing speech recognition on the speech information.

3. The computer readable storage device of claim 1 wherein processing the signaling information and the speech information is performed in a web services environment.

4. The computer readable storage device of claim 1 wherein the instructions further comprise providing a Computer Supported Telecommunications Application (CSTA) interface.

5. The computer readable storage device of claim 1 wherein the instructions further comprise interpreting a Simple Object Access Protocol (SOAP) message.

6. The computer readable storage device of claim 1 wherein the instructions further comprise processing the speech information to identify semantic information contained therein.

7. The computer readable storage device of claim 1 wherein the instructions further comprise transmitting information to a specified port associated with an Internet Protocol (IP) address.

8. The computer readable device of claim 1 wherein the instructions further comprise transmitting a Simple Object Access Protocol (SOAP) message.

9. A method of communication between a client and a server, comprising:
    selecting an internet protocol address and a port associated with the internet protocol address in one exchange between a client and a server in a web services environment through a media description extension of a Web Service Description Language (WSDL), wherein the one exchange represents an enhancement of a communications application functionality by adding a media coding and transport protocol extension to a WSDL standard so that both a signaling channel and a media channel are established in a single step, wherein the media coding and transport protocol are established as a result of a search through metadata of each of a plurality of web services;

establishing the media channel between the client and the server based on the internet protocol address and the port;

establishing the signaling channel between the client and the server; and exchanging information between the client and the server through the media channel according to the internet protocol address and the port and through the signaling channel.

10. The method of claim 9 wherein the information comprises speech information.

11. The method of claim 10 wherein exchanging information includes receiving speech information through the media channel .

12. The method of claim 11 and further comprising processing the speech information to identify semantic information contained therein.

13. The method of claim 9 wherein the specified protocol is based on CSTA (Computer Supported Telecommunication Applications).

14. The method of claim 9 and further comprising interpreting a Simple Object Access Protocol (SOAP) message.

15. The method of claim 9 and further comprising transmitting a Simple Object Access Protocol (SOAP) message.

16. A method for processing information in a computer network, comprising:

establishing a relationship between a client and a server in a web services environment, the web services environment not being a Session Initiation Protocol environment, wherein establishing includes accessing a list of a plurality of codecs and a plurality of protocols and receiving information regarding selection of one of the plurality of codecs as an established codec and selection of one of the plurality of protocols as an established protocol wherein the receiving information regarding the established codec and the established protocol occurs in one exchange between a client and a server, wherein the one exchange represents an enhancement of a communications application functionality by adding a media coding and transport protocol extension to a Web Services Description Language (WSDL) standard so that both a signaling channel and a media channel are established in a single step, wherein the established codec and the established protocol are obtained as a result of a search through metadata of each of a plurality of web services;

transmitting data from the client to the server according to established protocol, the data comprising audio data or text data;

converting the data from audio data to text data if the data is audio data and from text data to audio data if the data is text data; and transmitting converted data from the server to the client according to the established protocol.

17. The method of claim 16 wherein the specified protocol is based on CSTA (Computer Supported Telecommunication Applications).

* * * * *